United States Patent [19]
Burkhard et al.

[11] Patent Number: 5,968,105
[45] Date of Patent: Oct. 19, 1999

[54] PROCESS FOR FINDING THE TRANSVERSE ACCELERATION OF A VEHICLE

[75] Inventors: Dieter Burkhard, Waldfischbach-Burgalben; Manfred Dornseiff, Bromskirchen; Jean-Claude Schwartz, Frankfurt am Main; Alexander Volz, Dreieich, all of Germany

[73] Assignee: ITT Manufacturing Enterprises Inc., Wilmington, Del.

[21] Appl. No.: 08/793,506

[22] PCT Filed: Jul. 26, 1995

[86] PCT No.: PCT/EP95/02950

§ 371 Date: Sep. 25, 1997

§ 102(e) Date: Sep. 25, 1997

[87] PCT Pub. No.: WO96/06764

PCT Pub. Date: Mar. 7, 1996

[30] Foreign Application Priority Data

Aug. 27, 1994 [DE] Germany ............................. 44 30 458

[51] Int. Cl.$^6$ ..................................................... G01P 3/42
[52] U.S. Cl. ................................................. 701/70; 701/72
[58] Field of Search ................................ 701/70, 68, 69, 701/73, 75, 41, 72; 702/141; 73/146.2

[56] References Cited

U.S. PATENT DOCUMENTS

| | | | |
|---|---|---|---|
| 5,179,526 | 1/1993 | Zimmer et al. | 702/141 |
| 5,299,131 | 3/1994 | Haas et al. | 701/70 |
| 5,711,712 | 1/1998 | Graf | 477/121 |

OTHER PUBLICATIONS

English translation of the International Preliminary Examination Report for appl. No. PCT/EP95/02950 filed Jul. 26, 1995.

Primary Examiner—William A. Cuchlinski, Jr.
Assistant Examiner—Arthur Donnelly
Attorney, Agent, or Firm—Rader, Fishman & Grauer PLLC

[57] ABSTRACT

To determine the transverse acceleration of a vehicle, in particular as an input quantity for an electronic vehicle control system such as ABS, TCS, EBV, etc., the output signals of wheel sensors representative of the rotational behavior of the individual vehicle wheels are evaluated. The correction factors representing the differences of the tire tread circumferences of the individual wheels are determined. A short-time correction factor and a long-time correction factor KZ and LZ are produced in each case for the non-driven vehicle wheels. A difference between the long-time correction factor and the short-time correction factor of the respective wheel is determined and evaluated in a filtering and adapting circuit. The quotient KZ/LZ of the short-time correction factor and the long-time correction factor of the respective wheel is calculated, and the difference is produced between the quotients of the left and right non-driven $$Q_{FZ} = \left(\left(\frac{KZ}{LZ}\right)_{nal} - \left(\frac{KZ}{LZ}\right)_{nar}\right) * v_{FZ}^2 * K$$

wheels. The transverse acceleration of the vehicle $Q_{FZ}$ is the result of the relation

2 Claims, 2 Drawing Sheets ent invention relates to a method of determining the transverse acceleration of a vehicle, in particular as an input quantity for an electronic vehicle control system, e.g., for an anti-lock system (ABS), a traction slip control system (TCS), an electronic control system for brake force distribution (EBV), an active suspension control system or a driving stability control system (DSC).

It is easily comprehensible that in some situations the control quality may be improved considerably by taking the transverse acceleration into account in the calculation of the control quantities. A dangerous situation in terms of driving stability may be determined prematurely from the transverse acceleration. Cornering and the direction of cornering can also be seen at once in the transverse acceleration. Some control systems, such as driving stability control systems, are unable to function without a measurement of transverse accelerations.

Further, the knowledge of the instantaneous transverse acceleration permits monitoring other components and sensors of a control system. For example, the function of a separate transverse acceleration transducer or a steering angle emitter may be checked by the calculated transverse acceleration. If the control system determines and takes into account the different rolling circumferences of the individual wheels by correction factors, measuring the transverse acceleration permits monitoring the determination of the correction factors.

SUMMARY OF THE INVENTION

Therefore, an object of the present invention is to provide a method which permits determining the transverse acceleration of a vehicle in a simple manner, by little structure and a great degree of reliability.

It has been found that this object may be achieved by the method described in the attached claim 1.

In a preferred aspect of the present invention, a long-time average value of the difference between the long-time correction factor and the short-time correction factor of the respective wheel is produced in the filtering and adapting circuit by a low-pass filter. A partial value of the long-time average value is evaluated as a function of the long-time average value of the other wheels for the correction of the long-time correction factor.

Thus, according to the present invention, the transverse acceleration of the vehicle is calculated exclusively from the data supplied by the wheel sensors about the rotational behavior of the individual vehicle wheels. If a control system is used, as is conventional practice nowadays, wherein the calculations and data processing operations are performed by programmed circuits, such as microprocessors, microcontrollers, etc., no additional hardware is required for the calculation of the transverse acceleration according to the present invention. Any additional structure is limited to an extension of the program and the associated memories, if necessary.

Compared to conventional systems using special sensors, such as transverse acceleration sensors and/or steering angle emitters, etc., the calculation of the transverse acceleration by use of the method of the present invention is extremely exact because the calculation is based on the determination of the wheel speed differences in consideration of the short-time correction factors and the long-time correction factors.

Further details of the present invention can be seen in the following description of embodiments, making reference to the accompanying drawings.

DETAILED DESCRIPTION OF THE INVENTION

Figure 1:
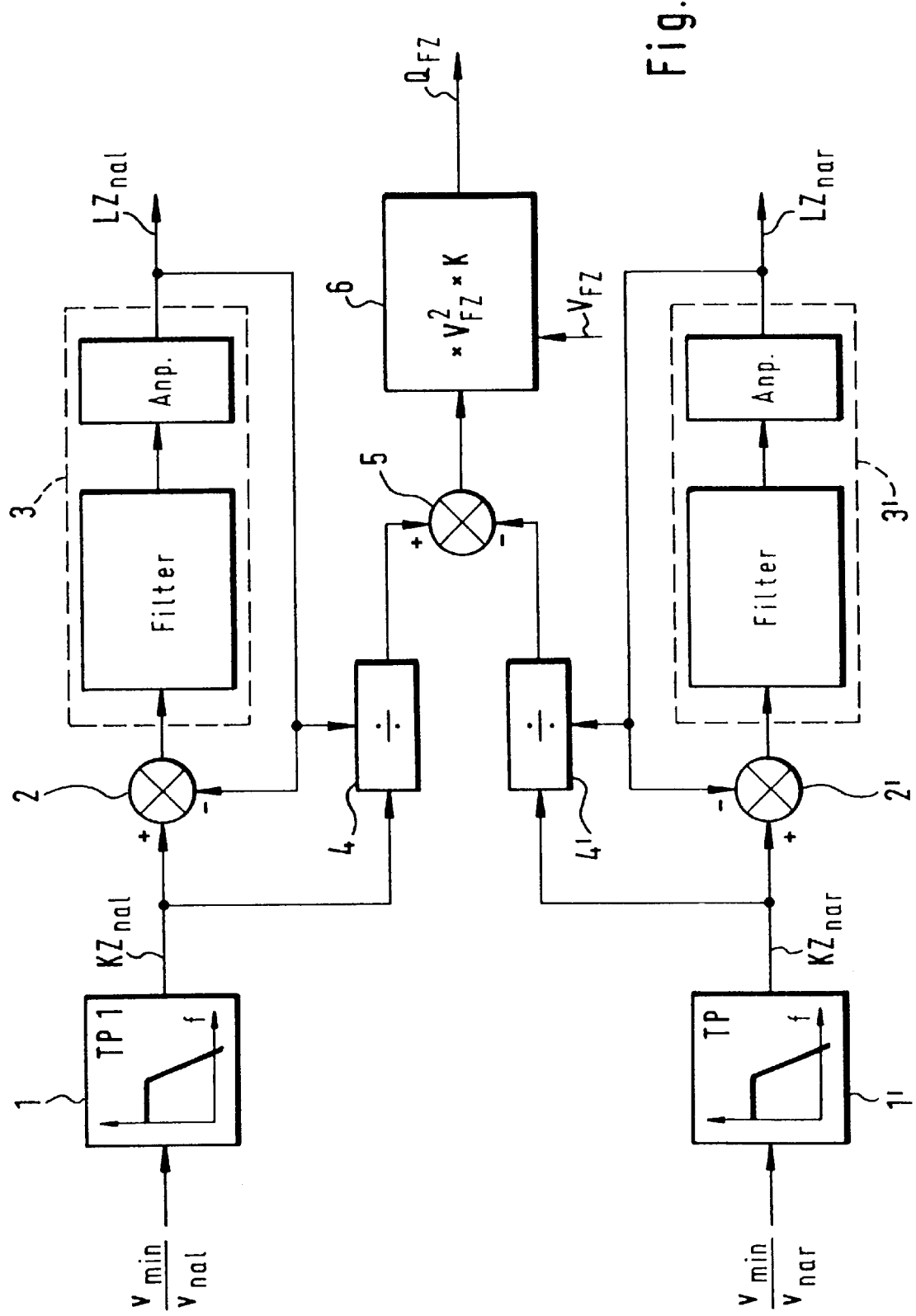
FIG. 1 is a schematically simplified diagram or principle view of a circuit for implementing the method of the present invention.

The circuit of FIG. 1 serves to illustrate the method of the present invention. The method is based on determining correction factors which are a standard for the different rolling circumferences of the individual vehicle tires. The correction factors are required already for exact anti-lock or traction slip control operations (ABS or TCS), in particular for an electronic control of brake force distribution, and also for other control systems.

The rotational speed difference of the non-driven axle is the basis for calculating the transverse acceleration $Q_{FZ}$. Initially, the input quantity is standardized. As an input quantity, the quotient of the instantaneously lowest wheel speed $v_{min}$ and the wheel speed of a non-driven wheel $V_{na}$ is produced. The upper circuit branch applies to the non-driven left wheel having the speed $V_{nal}$, and the second circuit branch applies to the non-driven right wheel having the speed $V_{nar}$.

Thus, the quotients $V_{min}/V_{nal}$ and $V_{min}/V_{nar}$ are input quantities. By way of a low-pass filter 1 or 1', a short-time correction factor $KZ_{nal}$ or $KZ_{nar}$ is produced from the respective input quantity $V_{min}/V_{nal}$ or $V_{min}/V_{nar}$ (because both circuit branches have an identical design, only the upper circuit branch will be described hereinbelow).

In the embodiment to which FIG. 1 relates, a digital filter or a digital low-pass filter (TP1) is used which calculates an average value of the input signal $V_{min}/V_{nal}$ at a clock frequency of e.g. 7 msec over 16 loops in each case, i.e. over roughly 100 millisec (112 msec, to be precise). The $$KZ_{nal} = \frac{1}{N}\sum_{i=1}^{N} \frac{C * v_{mini}}{v_{nal\,i}}$$

output signal of the low-pass filter 1 is the short-time correction factor (of course, the corresponding relation also applies to the correction factor $KZ_{nar}$). In this relation, $KZ_{nal}$ is the average value of the short-time correction factor of the non-driven left wheel, N is the number of loops or cycles, across which the average value is produced, $V_{min}$ is the instantaneously lowest wheel speed, $V_{nal}$ is the instantaneous speed of the non-driven left wheel, C is a constant.

The discrepancy or difference between a long-time correction factor, herein the correction factor $LZ_{nal}$ of the non-driven left wheel, and the short-time correction factor $KZ_{nal}$ is determined in a comparator and differentiator 2. The long-time correction factor $LZ_{nal}$ is derived from the output signal ($D_{nal}$) of the comparator and differentiator 2 in a filtering and adapting circuit 3. Details of the circuit 3 are explained hereinbelow by way of FIG. 2.

The quotient of the long-time correction factor and the short-time correction factor of the respective wheel is produced in a quotient calculator 4. Reference numeral 4 applies to the non-driven left wheel, and quotient calculator 4' functions accordingly for the non-driven right wheel. Subsequently, the difference between the two quotients KZ/LZ of the left and the right non-driven wheels is calculated in a differentiator 5. Finally, the difference between the two quotients is multiplied by the square of the instantaneous vehicle speed or vehicle reference speed and, further, by a constant factor K in a circuit block 6. The signal $Q_{FZ}$ representative of the transverse acceleration of the vehicle prevails at the output of the multiplier 6. Thus, the transverse acceleration $O_z$ is determined by the circuit shown in FIG. 1 (by way of hardware or $$Q_{FZ} = \left(\left(\frac{KZ}{LZ}\right)_{nal} - \left(\frac{KZ}{LZ}\right)_{nar}\right) * v_{FZ}^2 * K$$

program run) according to the relation

The constant K includes a constant k1, which is responsive to the vehicle speed or vehicle reference speed and assumed as "1" in the present case, and a constant k2, which takes into consideration the units of the individual operands and assumes a value in the order of $10^{-5}$ in the present case, and also the tire tread width SpW according to the relation $K = k1/(k2 \times SpW)$.

In the practice, it is also possible to predefine limit values for the transverse acceleration $Q_{FZ}$ by plausibility considerations or as a function of physically possible values and, if necessary, to correct the K factors in response to the limit values. The transverse acceleration may adopt a maximum value of "1g" ("g" is the gravitational acceleration) for physical reasons.

Figure 2:
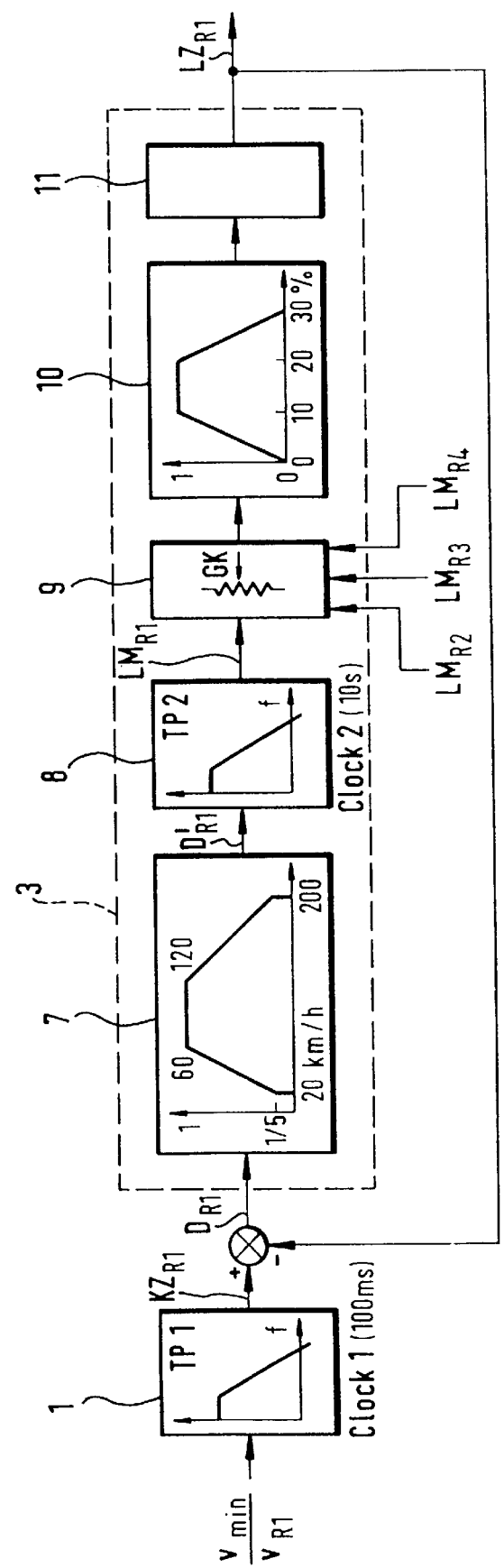
FIG. 2 is a view, similar to the illustration of FIG. 1, of further details of a circuit for determining the short-time correction factor and the long-time correction factor according to the circuit of FIG. 1.

FIG. 2 shows details of the filtering and adapting circuit 3 of FIG. 1. Index "R1" indicates that this circuit branch is associated with wheel No. 1.

The signal $D_{R1}$ representative of the difference between the long-time and the short-time correction factors of wheel 1 in the present embodiment shown is initially evaluated by a band pass filter 7 or weighted as a function of the vehicle speed. The band pass filter 7 permits passage of the difference signal $D_{R1}$ in its full amount in a medium speed range which is between 60 km/h and 120 km/h in the present case. However, the signal is extremely damped below a bottom speed threshold of 20 km/h and above a top speed threshold of 200 km/h. As is represented in the band pass filter 7, signal damping decreases linearly in the range between 20 km/h and 60 km/h and increases linearly in the range between 120 km/h and 200 km/h.

The output signal $D'_{R1}$, of the band pass filter 7, i.e. the weighted difference signal $D_{R1'}$, is further processed in a digital low-pass filter 8 (TP2). A long-time average value is produced according to $$LM_{R1} = \frac{1}{M} \sum_{i=N}^{M*N} f(D'_{R1})_i$$

the relation
wherein $LM_{R1}$ is the long-time average value of wheel 1, is the average value of the weighted deviation ($D'_{R1}$) of the short-time correction factor from the long-time correction factor of wheel 1, M is the number of the summing intervals N.

In the present embodiment, a long-time average value $LM_{R1}$ is produced in intervals of roughly 10 seconds in each case.

Only part of the long-time average value $LM_{R1}$ is conducted further due to a damping circuit 9. The amount of this part depends among others on so-called curve-weighting factors GK which are determined and evaluated by the damping circuit 9 in consideration of the long-time average values of the other wheels R2, R3 and R4. An expedient magnitude of the weighting factor GK can be found by a diagonal, sidewise and axlewise comparison of the long-time average values of the individual wheels.

Finally, the adoption of the output signal of the damping circuit 9 for each individual wheel is restricted to the long-time correction factor $LZ_{R1}$ in a following band pass filter 10. To weaken the effect of overspinning of the wheel to the long-time correction factor, the output signal of the damping circuit 9 is taken in its full amount if the signal value ranges between 0 and 10%, the signal is limited to 10% if its value ranges between 10 and 20%, and the signal is taken from 10 to 0% if its value ranges between 20 and 30%. The curve variation indicating the signal adoption is represented in the band pass filter 10.

The output signal of the band pass filter 10 is taken into account in an adapting circuit 11 for the correction of the long-time correction factor $LZ_{R1}$ which is finally returned from the output of the circuit 11 to the comparator and differentiator 2. The long-time correction factor is produced for each wheel in the mode of operation applying to wheel 1 as indicated above.

We claim:

1. A method of determining the transverse acceleration of a vehicle, in particular as an input quantity for an electronic vehicle control system, wherein the transverse acceleration of the vehicle is determined on the basis of the output signals of wheel sensors representing the rotational behavior of the individual vehicle wheels, in consideration of correction factors which determine the differences of the tire tread circumferences, by producing short-time correction factors and long-time correction factors at least for the non-driven vehicle wheels, the difference between the long-time correction factor and the short-time correction factor of the respective non-driven wheel is determined and evaluated in a filtering and adapting circuit, the long-time correction factor is corrected as a function of the signal produced in the filtering and adapting circuit, the quotient of the short-time correction factor and the long-time correction factor of the respective wheel is produced, the difference between the quotient produced from the short-time and long-time correction factors of the two non-driven wheels is produced, and the transverse acceleration is produced from these quotients according to the relation $$Q_{FZ} = \left(\left(\frac{KZ}{LZ}\right)_{nal} - \left(\frac{KZ}{LZ}\right)_{nar}\right) * v_{FZ}^2 * K$$

wherein $Q_{FZ}$ is the transverse acceleration of the vehicle, $$\left(\frac{KZ}{LZ}\right)_{nal}$$

is the quotient of the short-time correction factor and the long-time correction factor of the non-driven left wheel, $$\left(\frac{KZ}{LZ}\right)_{nar}$$

is the quotient of the short-time correction factor and the long-time correction factor of the non-driven right wheel, $V_{FZ}$ is the vehicle speed or vehicle reference speed, K is k1(k2×SpW); k1,k2 are constants, SpW is the tire tread width of the vehicle.

2. The method as claimed in claim 1 wherein a long-time average value of the difference between the long-time correction factor and the short-time correction factor of the respective wheel is produced in the filtering and adapting circuit by a low-pass filter, and in that a partial value of the long-time average value is evaluated for the correction of the long-time correction factor as a function of the long-time average value of the other wheels.

* * * * *